United States Patent [19]

Narukawa et al.

[11] Patent Number: 4,867,258
[45] Date of Patent: Sep. 19, 1989

[54] APPARATUS FOR WEIGHING POWDER MATERIALS

[75] Inventors: Akira Narukawa, Yokkaichi; Yoshimoto Kosegawa, Nishinomiya, both of Japan

[73] Assignee: NGK Insulators, Ltd., Nagoya, Japan

[21] Appl. No.: 304,887

[22] Filed: Feb. 1, 1989

Related U.S. Application Data

[63] Continuation of Ser. No. 200,980, Jun. 1, 1988, abandoned.

[30] Foreign Application Priority Data

Jun. 8, 1987 [JP] Japan .................. 62-142928
Aug. 31, 1987 [JP] Japan .................. 62-215185

[51] Int. Cl.⁴ ............... G01G 13/02; G01G 19/22; B65B 1/30
[52] U.S. Cl. .................. 177/116; 177/70; 141/83
[58] Field of Search ............ 177/70, 116; 141/83

[56] References Cited

U.S. PATENT DOCUMENTS 3,878,907 4/1975 Morick ..................... 177/70
4,459,028 7/1984 Bruder et al. ............ 141/83 X
4,498,783 2/1985 Rudolph .................. 177/70 X
4,544,279 10/1985 Rudolph .................. 177/70 X
4,619,336 10/1986 Boyer et al. ............. 177/116 X

FOREIGN PATENT DOCUMENTS 0188820 7/1986 European Pat. Off. .
61-159112 7/1986 Japan .
61-269022 11/1986 Japan .

*Primary Examiner*—George H. Miller, Jr.
*Attorney, Agent, or Firm*—Arnold, White & Durkee

[57] ABSTRACT

An apparatus for automatically and accurately weighing powder materials comprising powder containers containing powder materials, respectively, to be weighed, powder cups for directly receiving powder material from the powder containers, respectively, and means for automatically feeding the powder material from one of the powder containers to one of the weighing cups through a feeder is disclosed. Each of the powder containers is integrally provided with the feeder so that one powder material fed into the weighing cup through the feeder is prevented from contaminating with other powder materials and therefore, the powder material can be accurately weighed. The powder container includes means for improving the accuracy of weighing.

13 Claims, 8 Drawing Sheets

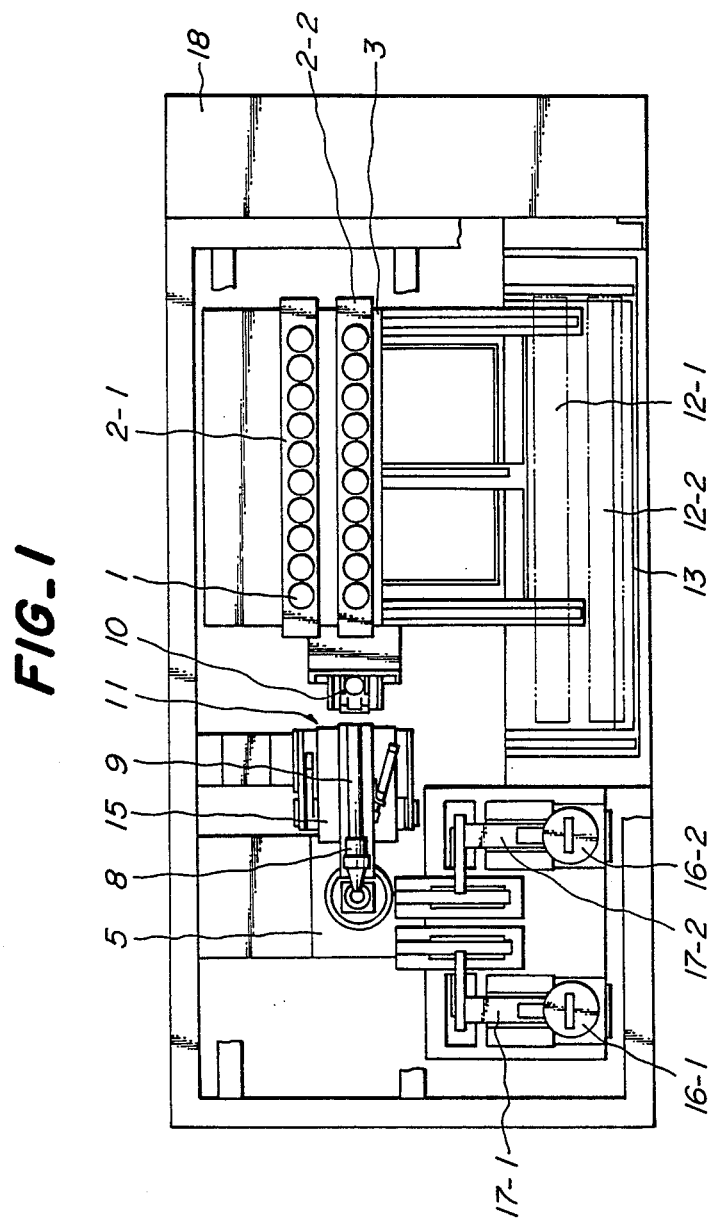
FIG._1

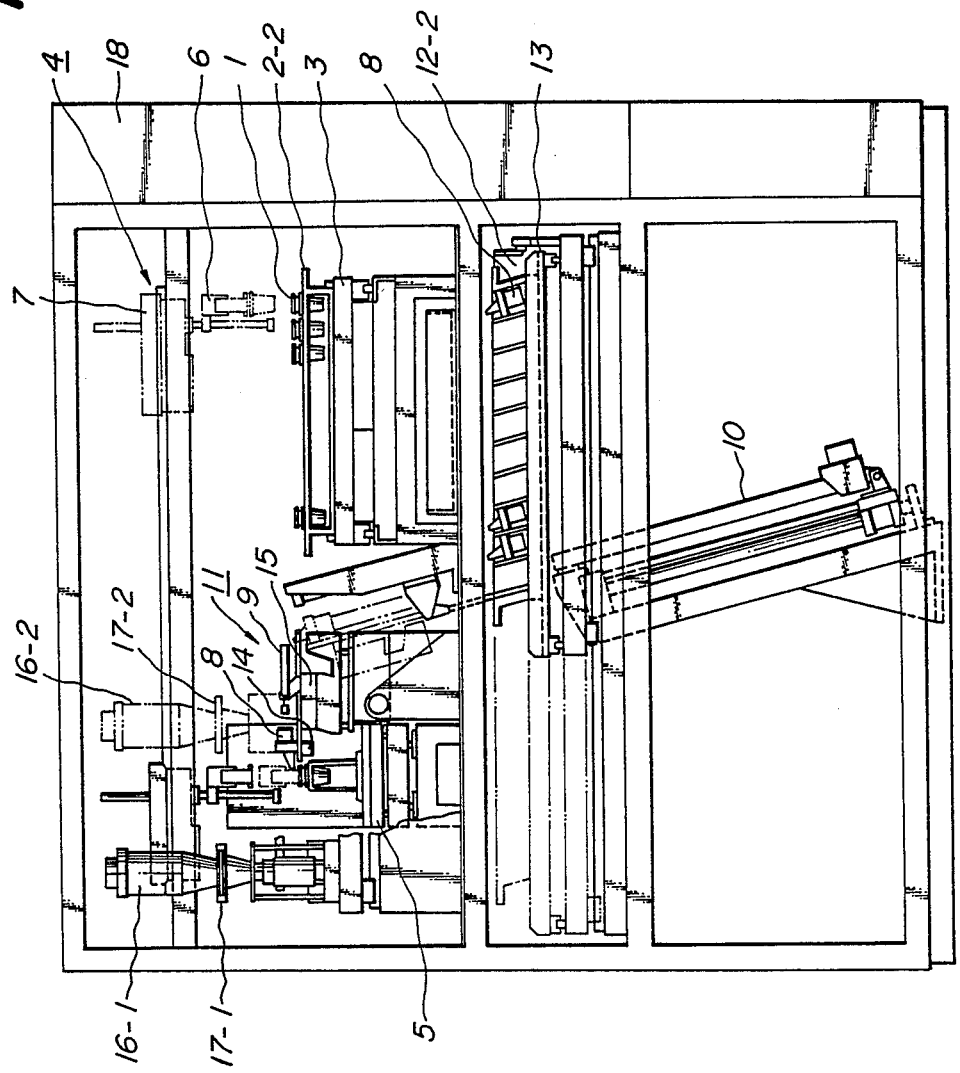

FIG_3
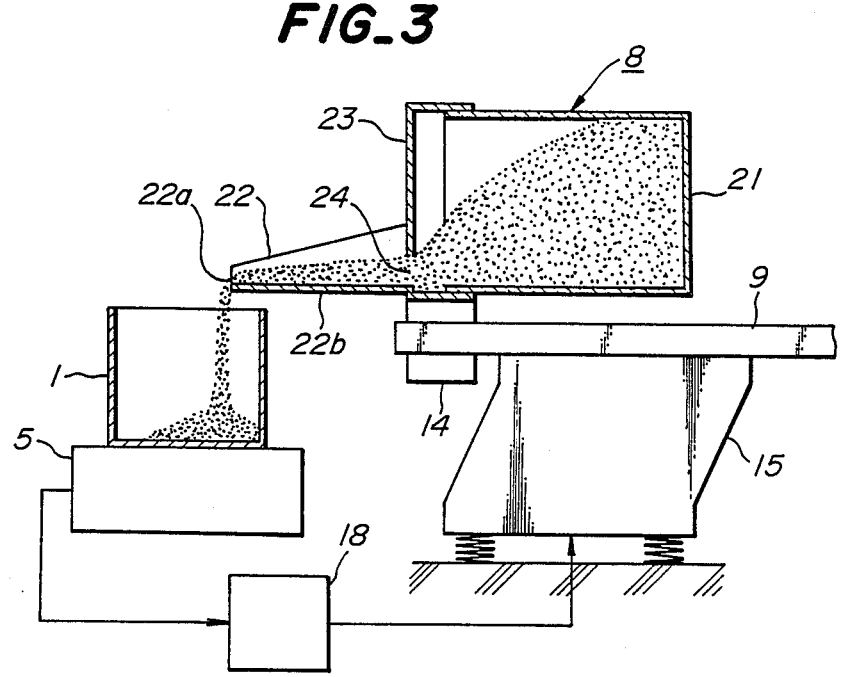
FIG_4
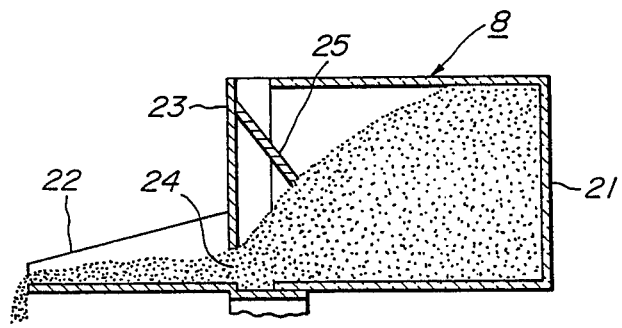

FIG_5
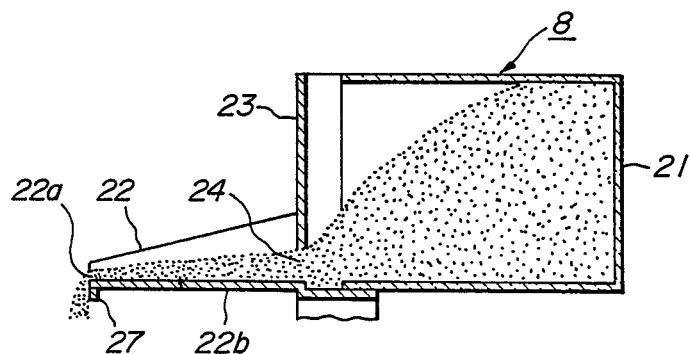
FIG_6
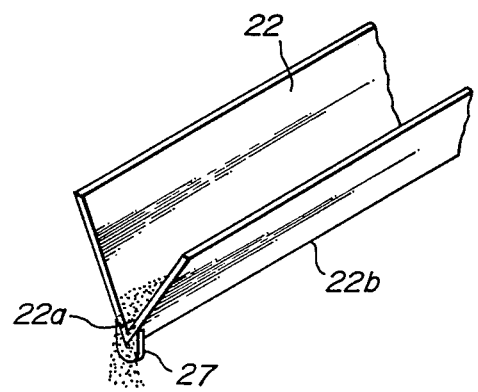

FIG_7
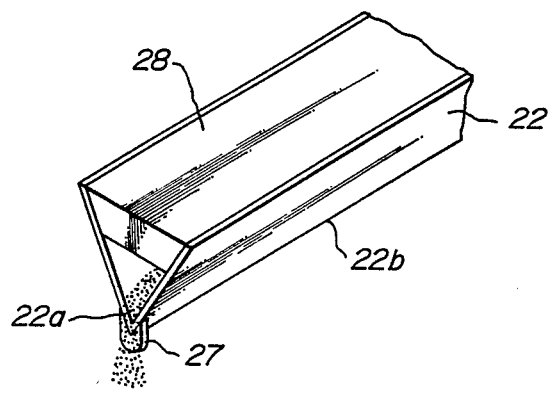
FIG_8
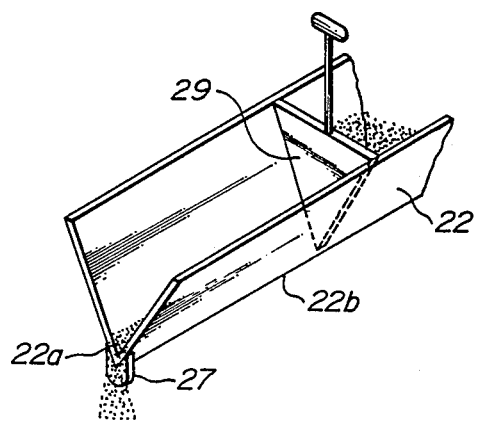

FIG_9
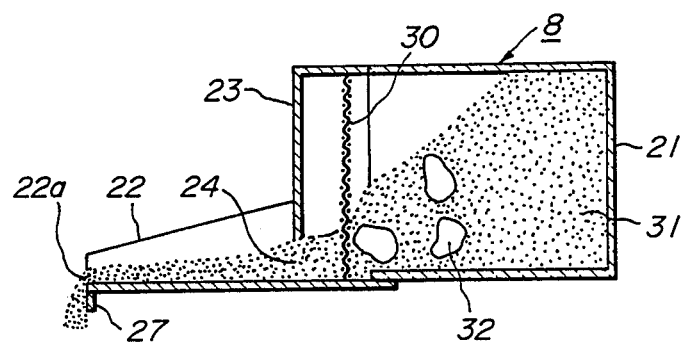
FIG_10
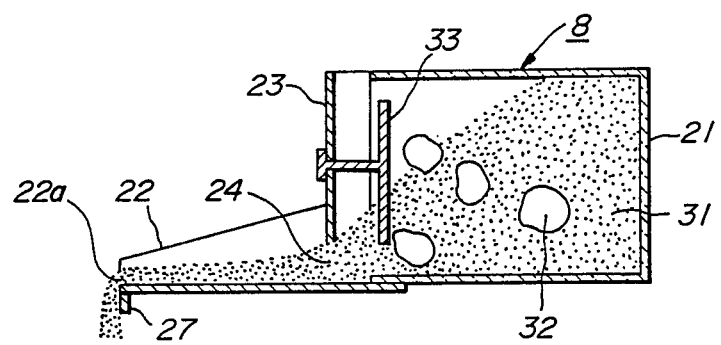
FIG_11
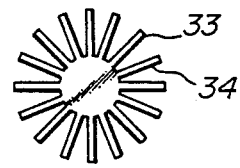

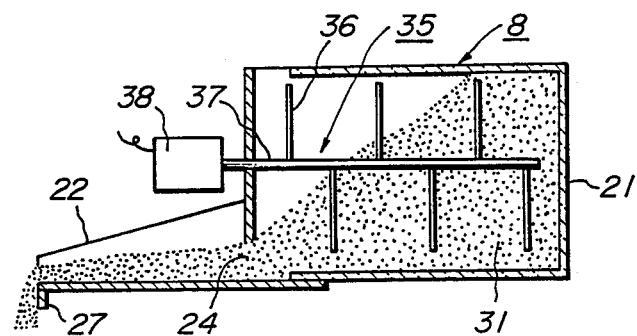
FIG_12
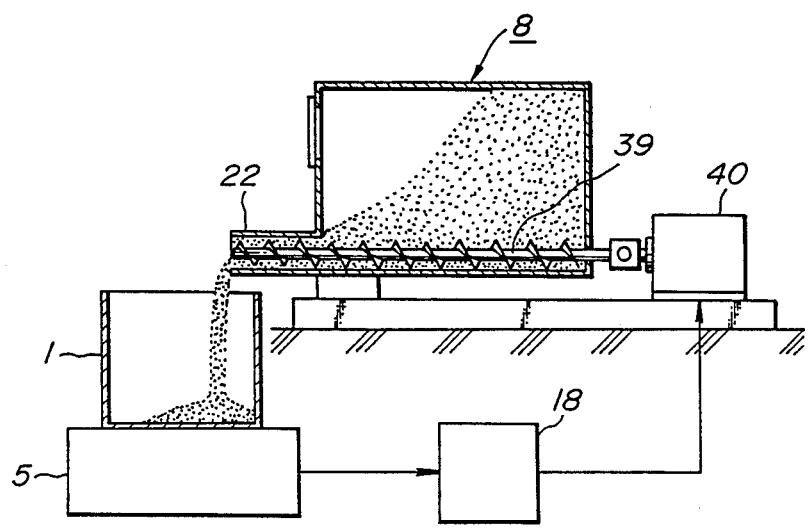
FIG_13

APPARATUS FOR WEIGHING POWDER MATERIALS

This application is Rule 62 Continuation application of U.S. Ser. No. 07/200,980, filed Jun. 1, 1988, now abandoned.

BACKGROUND OF THE INVENTION

1. Field of the Invention

The present invention relates to an apparatus for automatically weighing a number of different kind of powder materials in accordance with a desired mixing ratio.

Recently there has occurred a necessity for automatically and accurately weighing powder in the order of milli-gram for the purpose of production of a new mixture by mixing inorganic materials such as ceramics, cement or the like.

2. Related Art Statement

Hitherto, such an apparatus for accurately weighing powder material comprising a vibrating feeder provided at an outlet of a hopper for automatically feeding a powder material into a weighing cup mounted on an electronic balance has been known.

Such a known weighing apparatus is however adapted for weighing only one kind of powder material. Accordingly, in case of weighing other kinds of powder material, it is necessary that the powder hopper is interchanged with other powder hoppers and the vibrating feeder is also interchanged or washed so as not to be mixed or contaminated by the powder material which has been previously weighed. Such an operation requires extensive labor and time loss. Furthermore, there are problems such that it is difficult to prevent perfectly the previously weighed powder material from mixing into the next weighing powder material and the accuracy of weighing is not satisfied. Therefore, the known apparatus can not be utilized for weighing a powder material used, for example in a paint or a medicine which must not be permitted to be mixed or contaminated with other powder materials.

SUMMARY OF THE INVENTION

It is the object of the invention to provide an apparatus for weighing many kinds of powder materials with high accuracy and automation.

According to the present invention, for accomplishing the above object, the weighing apparatus comprises a plurality of powder containers for containing each of the powder materials to be weighed and having a feeder integrally formed therewith, a plurality of weighing cups for directly receiving each of the powder materials from the powder containers through the feeder thereof, means for weighing the powder material in the weighing cup, means for feeding the powder material to the weighing cup from the powder container and a controller for controlling the feed of the powder material by comparing the measured weight of the powder material with a predetermined target weight.

Each of a plurality of powder containers containing different kind of powder materials, respectively has its feeder integrally formed with the cap of the container so that the different powder material completely can be prevented from mixing to each other and also can be accurately weighed.

The powder container according to the present invention comprises a container body and a cap being secured to the container body and having an outlet and said feeder is preferably in the form of a tapered trough and is integrally formed with the cap so as to communicate with the interior of the container body through the outlet.

One embodiment of the feeder in accordance with the invention has a projection downwardly extended from the front end of the feeder. This has the advantage that the projection can prevent the powder material from electrostatically adhering to the underside of the feeder due to static electricity caused by vibration and therefore, the accuracy of weighing is improved.

Another favorable embodiment of the powder container has a blade extending from the cap in the interior of the container body for preventing a lump of powder from occurring in the container. Preferably, the powder container has a screen arranged in the container body for preventing large particles from discharging out of the container.

A practical embodiment of the apparatus according to the present invention further comprises one or more weighing cup trays for holding the weighing cups, means for transferring one weighing cup between the weighing cup trays and the powder weighing means, one or more powder container trays for holding the powder containers and means for transferring a predetermined powder container between the powder container trays and the powder feeding means. Thus, the powder container containing one kind of powder material can be automatically interchanged with the other powder container containing another kind of powder material so that different kinds of powder materials can be automatically and accurately weighed.

BRIEF DESCRIPTION OF THE DRAWINGS

Some embodiments of the invention will now be described in more detail, by way of example, with reference to the accompanying drawings, in which:

FIG. 1 is a plan view of an embodiment of the weighing apparatus in accordance with the invention;

FIG. 2 is an elevational view of the apparatus shown in FIG. 1;

FIG. 3 shows schematically and partly in sectional view an embodiment of the powder feeding and weighing system;

FIG. 4 is a sectional view of another embodiment of the container with a feeder;

FIG. 5 is a view similar to FIG. 4 showing another embodiment of the container with a feeder;

FIG. 6 is an enlarged perspective view of the front end portion of the feeder shown in FIG. 5;

FIGS. 7 and 8 are views similar to FIG. 6 showing other embodiments of the feeder;

FIGS. 9 and 10 are sectional views of other embodiments of the container;

FIG. 11 is a front view of a baffle plate shown in FIG. 10;

FIG. 12 is a sectional view of another embodiment of the feeder; and

FIGS. 13 and 14 are views similar to the FIG. 3 showing other embodiments of the feeding device.

DETAILED DESCRIPTION OF THE PREFERRED EMBODIMENTS

Figure 14:
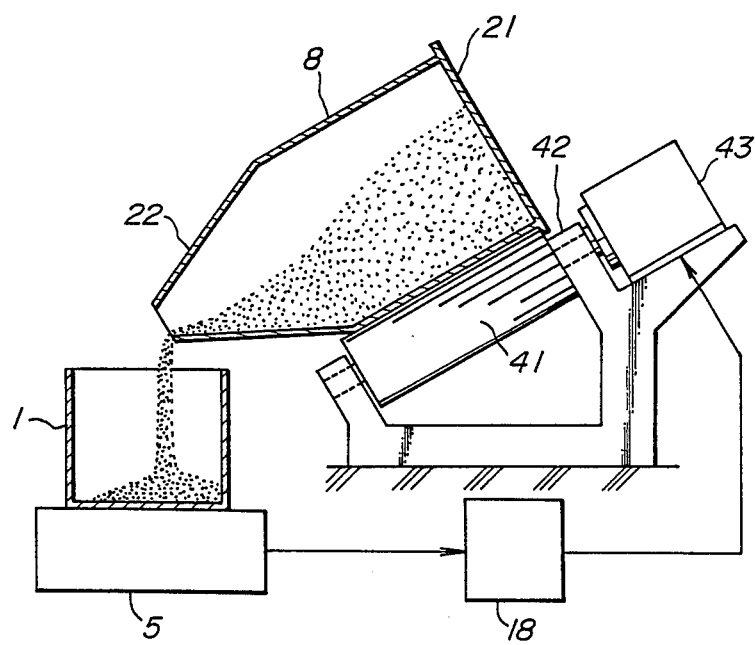

In the embodiment shown in FIGS. 1 and 2, a plurality of weighing cups 1 are prepared and retained in each of weighing cup trays 2-1 and 2-2. The weighing cup trays 2-1 and 2-2 can be positioned at a cup transporting position as shown in the position of the tray 2 by means of a tray slide mechanism. The weighing cup 1 in the weighing cup trays 2-1 or 2-2 at the cup transporting position is transported to an electronic balance 5 of the weighing device by means of a weighing cup transfer device 4 in sequence. The weighing cup transfer device 4 mainly consist of a grasping mechanism 6 adapted for clamping the weighing cup 1 and a cup elevating and transporting mechanism 7 adapted for mounting the weighing cup 1 on the electronic balance 5 from the weighing cup tray. The electronic balance 5 can be selected in accordance with the desired accuracy from the conventional electronic balances and in the embodiment, use is made of an electronic balance having the maximum weighing value of 200 grams and a reading accuracy of 0.1 milligram.

A powder feeding mechanism 11 mainly consist of a powder container 8, means 9 for feeding powder and a container transfer device 10. The powder feeding means 9 has a vibrator unit 15 and is arranged such that a desired weight of powder is fed from the container 8 into the weighing cup 1 by intermittently feeding the powder from the container 8 into the weighing cup 1 and adjusting strength of vibration of the vibrator unit 15 of the feeding means by a controller 18 receiving an output signal from the electronic balance 5 weighing the weight of the powder fed in the weighing cup to detect the amount of the fed powder as shown in FIG. 3.

The powder container 8 comprises a container body 21 which may be formed by a conventional glass weighing bottle and a cap 23 which is secured to the container body 21 and has a feeder 22 in the form of a tapered trough as shown in FIG. 3. The feeder 22 is adapted to feed out the powder in the container body 21 through an outlet 24 formed in the cap 23. The dimension of the outlet 24 may be selected in accordance with the powder to be weighed. The weighing time can be shortened by providing a large outlet, while the accuracy of weighing can be improved by providing a small outlet. The powder container is removably connected to the top of the vibrator unit 15 by a connector portion 25 provided on the bottom of the cap 24. The powder containers 8 are filled with different powder materials, respectively.

Ten containers are retained in each of the powder container trays 12-1 and 12-2. Each of the container trays 12-1 and 12-2 is transported to the position of the powder container transfer device 10 by means of the powder container tray slide mechanism 13 and then displaced in the direction perpendicular to the transfer direction of the transfer device. After the container 8 containing powder to be weighed has reached the position of the container transfer device 10 by means of the container tray slide mechanism 13, the container 8 is transported on the vibrator unit 15 consisted of a powder feeding electromagnetic feeder and is connected to the vibrator unit 15 by means of a container clamping mechanism 14 of the powder feeding means 9 which is tilted to a position shown by a solid line in FIG. 2. After weighing, the container clamping mechanism 14 is released to disconnect the container 8 from the vibrator unit 15. The powder container transfer device 10 is then positioned to the location in the powder container tray 12-1 or 12-2 to which location the powder container is to be returned by means of the tray slide mechanism 13 and is driven to return the powder container 8 to the location.

After the powder feeding means 9 has locked the powder container 8 containing powder to be weighed by means of the clamping mechanism 14, the powder is fed from the container 8 into the weighing cup 1 on the electronic balance 5 by vibration of the vibrator unit 15 until the target weight has been reached. The vibration of the vibrator unit 15 may be maintained at a constant strength until the weight of the powder being fed into the container reaches near the target weight, but the weight of powder fed into the weighing cup is intermittently measured at a constant interval. After the weight of powder has reached near the target weight, preferably the feed of the powder is controlled by adjusting an electric voltage applied to the vibrator unit so as to ensure the target weight.

In the present embodiment, the powder feeding mechanism 11 is provided with powder hoppers 16-1, 16-2 and electromagnetic feeder units 17-1, 17-2 which are displaceable so as to add an additive to the powder in the weighing cup 1 from the hopper. Some powder to be fed in large amount may be preferably fed from such a hopper.

The weighing cup 1 contained with the weighed powder or powders is returned from the position on the electronic balance 5 to the location in the weighing cup tray 2-1 or 2-2 by means of the weighing cup transfer device 4 in the reverse of the manner mentioned above. The all of the operation of the apparatus may be controlled by the controller 18. The controller 18 comprises a conventional computer.

The powder container may be modified in accordance with the nature of the powder to be weighed in order to improve the weighing accuracy.

FIG. 4 shows a modification of the powder container 8. This container has a blade 25 for breaking a lump of powder formed by the vibration in order to ensure more accurate weighing of powder.

FIGS. 5 and 6 show a modification of the powder container 8 having a modified feeder 22 which is preferably used for accurately weighing powders which generate static electricity by vibration. Such a feeder 22 is in the form of a tapered trough having a V shape section and is provided with a projection 27 downwardly extended from the front end 22a thereof and thereby the projection 27 prevents the charged powder from adhering on and along the under surface 22b over the front end 22a of the feeder 22 to finally drop on the balance 5. The feeder 22 may be provided with a protective cover 28 as shown in FIG. 7. FIG. 8 shows another embodiment of the feeder 22 provided with a shatter 29.

FIGS. 9~12 show modifications of the powder container 8 which are preferably used for powders having a tendency of aggregating to form lumps of powder in the container. In FIG. 9, a screen 30 is arranged within the container body 21 to prevent a lump of powder 31 or a large particle 32 from feeding out of the container 8.

In FIG. 10, a baffle plate 33 having spiders 34 radially extending from the central portion thereof as shown in FIG. 1 is arranged within the container body, 21 to prevent a large particle 32 from feeding out of the container 8.

FIG. 12 is a further modified embodiment of the powder container 8. In this embodiment, an agitator 35 having a plurality of agitating blades 36 radially extended from a rotary shaft 37 is arranged within the container 8 by rotatively supporting the rotary shaft 37 in a bearing on the cap 23 and is driven by means of miniature electric motor 38 so as to agitate the powder 31 in the container 8.

FIG. 13 shows another embodiment of the feeding means comprising a feed screw 39 extended through the container body 21 and drivably connected to an electric motor 40.

FIG. 14 is a further embodiment of the feeding means. In this embodiment, the container 8 is supported on a rotary drum 41 which is rotatively supported on a frame 42 in an inclined position and is rotatively driven by means of an electric motor 43.

In operation of the above mentioned apparatus, firstly empty weighing cups are set in the weighing cup tray 2-1 and 2-2. Meanwhile, powder containers 8, which are filled with different powder materials, respectively, are set at the predetermined positions in the powder container trays 12-1 and 12-2 and the position and the kind of the powder are inputed into the controller together with the weighing sequence. Then the weighing cup transfer device 4 is driven to transport the weighing cup 1 in the weighing cup tray 2-1 or 2-2 to the electronic balance 5. The powder container 8 is mounted on the top of the tilted powder feeding means 9 by means of the powder container transfer device 10. After the powder feeding means has returned to the initial horizontal position, the vibrator unit 15 begins to vibrate the powder container, thereby the powder is fed into the weighing cup 1 from the powder container 8. If necessary, the additive powders in the hoppers 16-1 and 16-2 are added to the powder in the weighing cup 1. The weighing cup 1 is then returned to the predetermined position in the weighing cup tray 2-1 or 2-2 to complete the weighing operation for one kind of powder.

EXAMPLE 1

Different powders were weighed to the target weight of 3 g by using the automatic weighing apparatus according to the present invention. The vibrator unit was strongly vibrated until the weight of the powder fed in the weighing cup reached to 2,950 milli-gram and then the vibration was gradually reduced. The result of the weighing is shown in the following Table 1 together with the types of powder containers used in the above tests. In the Table 1, the large feeder has the outlet of 6 mm$\phi$ and the small feeder has the outlet of 3 mm$\phi$.

TABLE 1

| Powder | Container type | | Actual weighed weight (g) | |
|---|---|---|---|---|
| | feeder | blade | first run | second run |
| Alumina | large | no | 3.0009 | 2.9991 |
| Chromium oxide fine powder | large | have | 3.0010 | 3.0056 |
| Silicon nitride fine powder | large | have | 2.9984 | 2.9999 |
| Clay | large, small | no | 3.0053 | 2.9982 |
| Zirconia | large, small | no | 2.9994 | 2.9989 |
| Feldspar | large | no | 2.9980 | 3.0031 |
| Glass | large | no | 2.9976 | 3.0009 |
| Pottery stone | large | no | 2.9977 | 3.0004 |
| Glaze | large | no | 2.9982 | 2,9989 |
| Talc | large | no | 3.0006 | 3.0012 |

EXAMPLE 2

Different powders is listed in the following Table 2 were prepared in a particle size smaller than 150 μm and dried by heating at 105° C. for more than two hours. The treated powders were weighed by using the powder container 8 shown in FIG. 9 and the feeding means shown in FIG. 3. The result of the weighing is shown in Table 2. Furthermore, powder materials of carbon and lithium tetraborate were repeatedly weighed in a similar condition and the result of this weighing is shown in the following Table 3.

TABLE 2

| Powder | Target weight (g) | Actual weight (g) | Error (g) |
|---|---|---|---|
| Pottery stone | 6.000 | 5.9998 | −0.0002 |
| Pyrophyllite | 6.000 | 6.0000 | 0 |
| Silica sand | 6.000 | 6.0002 | +0.0002 |
| Feldspar | 6.000 | 6.0000 | 0 |
| Talc | 10.000 | 10.0004 | +0.0004 |
| Clay | 6.000 | 5.9997 | −0.0003 |
| Mixture | 2.000 | 2.0000 | 0 |
| Glaze | 2.000 | 2.0003 | +0.0003 |
| Zirconia | 8.000 | 7.9999 | −0.0001 |
| Cement | 8.000 | 8.0001 | +0.0001 |
| Alumina | 5.000 | 5.0000 | 0 |
| Zircon sand | 8.000 | 7.9997 | −0.0003 |
| Iron oxide | 6.000 | 6.0002 | +0.0002 |
| Pigment | 30.000 | 30.0008 | +0.0008 |
| Kaolin | 10.000 | 10.0004 | +0.0004 |

TABLE 3

| | | Carbon | Lithium tetraborate |
|---|---|---|---|
| Target weight (g) | | 0.6000 | 5.000 |
| | 1 | 0.5997 | 4.9999 |
| | 2 | 0.6003 | 4.9997 |
| | 3 | 0.6000 | 5.0005 |
| | 4 | 0.6004 | 5.0000 |
| | 5 | 0.5997 | 5.0001 |
| | 6 | 0.6003 | 4.9998 |
| | 7 | 0.5998 | 4.9999 |
| | 8 | 0.5999 | 4.9996 |
| | 9 | 0.5999 | 5.0003 |
| Actual weight (g) | 10 | 0.5999 | 4.9998 |
| | 11 | 0.6006 | 5.0002 |
| | 12 | 0.5996 | 5.0005 |
| | 13 | 0.5997 | 4.9997 |
| | 14 | 0.5996 | 4.9998 |
| | 15 | 0.6001 | 5.0000 |
| | 16 | 0.5997 | 4.9999 |
| | 17 | 0.6008 | 5.0006 |
| | 18 | 0.6000 | 5.0008 |
| | 19 | 0.6005 | 4.9999 |
| | 20 | 0.6005 | 5.0005 |
| Mean | (g) | 0.60005 | 5.00008 |
| Range | (g) | 0.0012 | 0.0012 |
| Standard deviation | (g) | 0.00037 | 0.00036 |
| Coefficient of variation | (%) | 0.06 | 0.007 |

It is understood from the results shown in the Tables, the powders can be accurately weighed by use of the automatic weighing apparatus according to the present invention.

Obviously the invention is not limited to the embodiments shown. For example, it is possible to use a plurality of powder containers for containing the same powder for the purpose of weighing a large amount of the same powder. The powder container is also not limited to the conventional glass weighing bottle and the number of the weighing cups, the powder containers and the trays are not limited to the embodiments shown.

What is claimed is:

1. An apparatus for automatically weighing powder materials comprising a plurality of powder containers for containing each of the powder materials to be weighed and having a feeder integrally formed therewith, a plurality of weighing cups for directly receiving each of the powder materials from the powder containers through the feeder thereof, means for weighing the powder material in the weighing cup, means for feeding the powder material to the weighing cup from the powder container and a controller for controlling the feed of the powder material by comparing the weighing weight of the powder material with a predetermined target weight.

2. An apparatus as claimed in claim 1, wherein said powder container comprises a container body and a cap being secured to the container body and having an outlet, and said feeder is in the form of a tapered trough and is integrally formed with the cap so as to communicate with the interior of the container body through the outlet.

3. An apparatus as claimed in claim 2, wherein said feeder has a projection downwardly extended from the front end of the feeder.

4. An apparatus as claimed in claim 2, wherein said powder container has a blade extending from the cap in the interior of the container body for breaking a lump of powder.

5. An apparatus as claimed in claim 2, wherein said powder container has a screen arranged in the container body for preventing a large particle from discharging out of the container.

6. An apparatus as claimed in claim 2, wherein said powder has an agitator rotated within the container body for crushing a lump of powder.

7. An apparatus as claimed in claim 1, wherein said weighing means is an electronic balance.

8. An apparatus as claimed in claim 1, wherein said powder feeding means comprises a vibrator unit on which the powder container is removably mounted.

9. An apparatus as claimed in claim 1, wherein said powder feeding means is a screw feeder extending through the powder container.

10. An apparatus as claimed in claim 1, wherein said powder feeding means is a rotary drum on which the powder container is supported.

11. An apparatus as claimed in claim 1, wherein said controller is arranged such that the amount of powder fed to the weighing cup is continuously detected and is compared with the target weight to control the powder feeding means.

12. An apparatus as claimed in claim 1, further comprising one or more weighing cup trays for holding the weighing cups, means for transferring one weighing cup between the weighing cup trays and the powder weighing means, one or more powder container trays for holding the powder containers, and means for transferring a predetermined powder container between the powder container trays and the powder feeding means.

13. An apparatus as claimed in claim 12, further comprising one or more hoppers and vibrator feeders connected to the hoppers, respectively for feeding additive powders to the weighing cup on the powder weighing means.

* * * * *